United States Patent [19]

Herman

[11] Patent Number: 5,197,349
[45] Date of Patent: Mar. 30, 1993

[54] EXPANDER NUT STRUCTURE FOR A HANDLEBAR STEM

[75] Inventor: William P. Herman, Marblehead, Mass.

[73] Assignee: Hsin Lung Accessories Co., Ltd., Taiwan

[21] Appl. No.: 684,019

[22] Filed: Apr. 11, 1991

[51] Int. Cl.⁵ .................. B62K 21/12; B62K 21/16
[52] U.S. Cl. .................. 74/551.1; 74/551.3; 74/551.4; 280/278; 280/287; 403/297; 403/374
[58] Field of Search .............. 74/551.1, 551.3, 551.4; 280/278, 287; 403/297, 374

[56] References Cited

U.S. PATENT DOCUMENTS

| | | |
|---|---|---|
| 2,487,661 | 11/1949 | McCauley, Jr. ............... 74/551.6 |
| 2,505,648 | 4/1950 | Pawsat ............... 287/52.02 |
| 3,361,455 | 1/1968 | Hussey et al. ............... 287/52.02 |
| 3,385,615 | 5/1968 | Hussey ............... 287/54.1 |
| 3,722,930 | 3/1973 | Humlong ............... 74/551.1 X |
| 4,068,858 | 1/1978 | Harrison et al. ............... 74/551.1 X |
| 4,095,911 | 6/1978 | Lacroix ............... 403/374 X |
| 4,108,461 | 8/1978 | Hopper ............... 74/551.3 X |
| 4,113,395 | 9/1978 | Pawsat et al. ............... 74/551.1 X |
| 4,134,703 | 1/1979 | Hinners ............... 403/374 X |
| 4,167,352 | 9/1979 | Pletscher ............... 403/374 X |
| 4,274,301 | 6/1981 | Katayama ............... 74/551.1 |
| 4,310,260 | 1/1982 | Katayama ............... 403/374 X |
| 4,601,483 | 6/1986 | McMurtrey ............... 74/551.1 X |
| 4,653,768 | 3/1987 | Keys et al. ............... 74/551.1 X |
| 4,688,817 | 8/1987 | Marier ............... 74/551.4 X |

FOREIGN PATENT DOCUMENTS

| | | | |
|---|---|---|---|
| 912868 | 8/1946 | France ............... | 74/551.3 |
| 2397316 | 3/1979 | France ............... | 74/551.1 |
| 44056 | 3/1917 | Sweden ............... | 403/374 |
| 616126 | 7/1949 | United Kingdom ............... | 403/374 |

Primary Examiner—Leslie A. Braun
Assistant Examiner—David E. Henn
Attorney, Agent, or Firm—Wolf, Greenfield & Sacks

[57] ABSTRACT

A handlebar stem provides a cylindrical quill tube having a hollow upper end and a lower end adapted to be placed snugly within a steering tube. The lower end has press fit thereon an insert having an external portion with an outer diameter substantially equal to that of the quill tube. The lower edge of each of the insert and quill tube are cut such that it defines an ovular plane through both the insert and quill tube. The lower end engages flushly with a similarly cut expander bolt having a cylindrical outer surface of substantially similar outer diameter to that of the quill tube and insert. The expander bolt is axially joined to the insert by means of a screw placed through the insert and into a threaded hole in the expander bolt with the head of the screw abutting an uppermost surface of the insert within the quill tube.

15 Claims, 2 Drawing Sheets

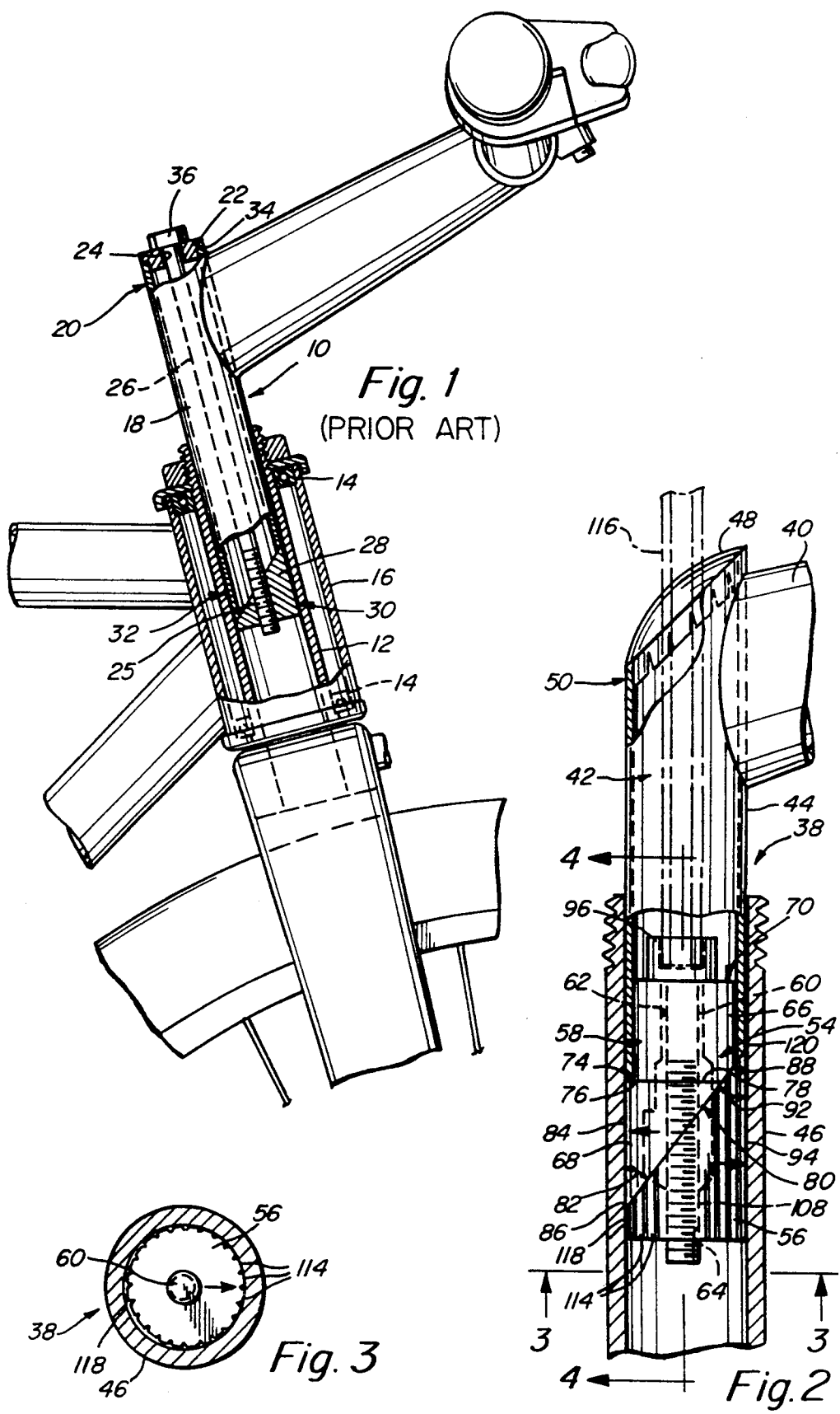

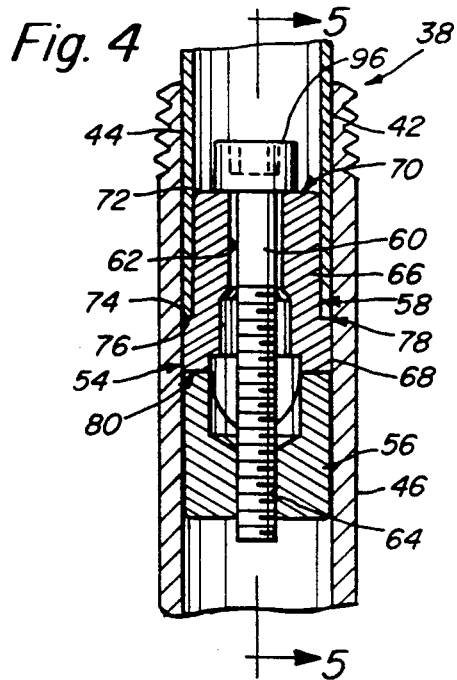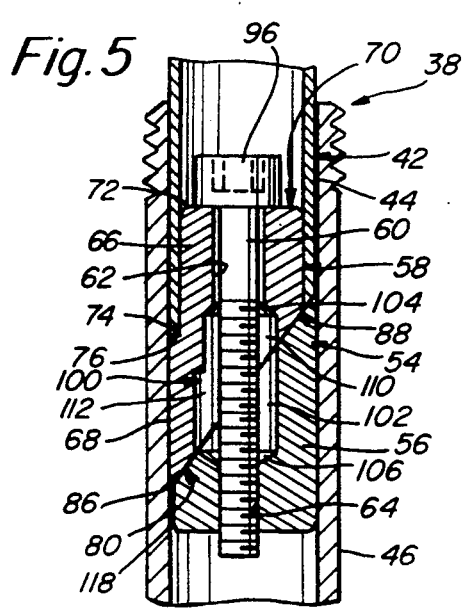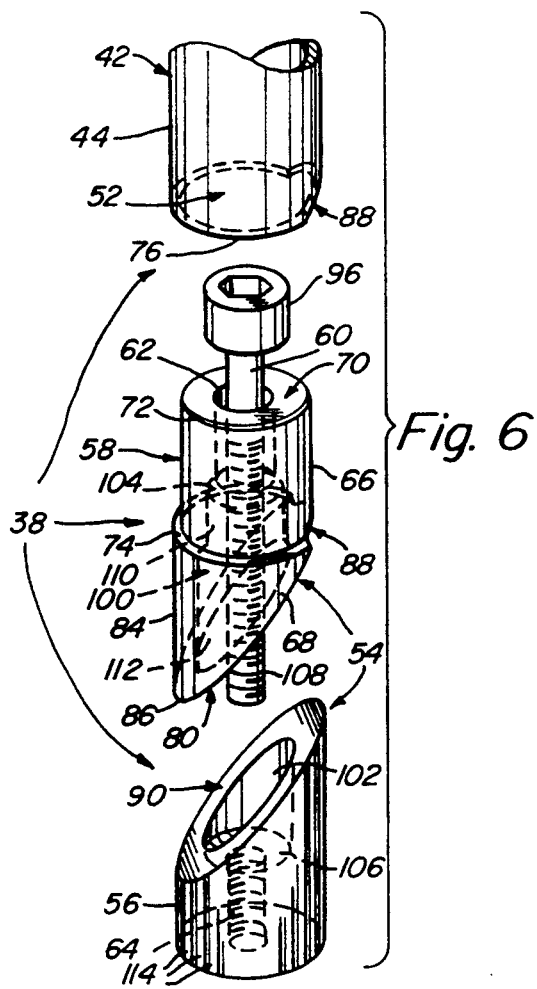

EXPANDER NUT STRUCTURE FOR A HANDLEBAR STEM

FIELD OF THE INVENTION

This invention relates to handlebar stems and more particularly to a handlebar stem having a recessed expander nut construction.

BACKGROUND OF THE INVENTION

Handlebar stems using wedge shaped expander nut to secure a stem quill tube within the front fork steering tube of a bicycle have been known and used for many years. A relatively conventional stem structure 10 is depicted in exposed side view in FIG. 1. A steering tube 12 is mounted upon bearings 14 within the bicycle frame head tube 16. The quill tube 18 of the stem 10 is mounted within the steering tube 12, is hollow and includes, upon an exposed end 20, a cap 22 having a hole 24 drilled therethrough for accepting a long bolt 26. The threaded end 28 of the screw 26 engages the center of a wedge shaped expander nut 28 positioned within the steering tube 12. The quill tube 18, expander nut 28 and steering tube 12 fit together snugly so that when the elongated screw 26 is tightened, the expander nut 28 is urged to move axially which, by virtue of the wedged interconnection of the quill tube 18 and expander nut 28, causes radially opposing displacement of the expander nut versus the quill tube. As such, the extended ends 30, 32 of each of the expander nut 28 and quill tube 18 become forced against diametrically opposed inner walls of the steering tube 12. This force prevents both radial and axial movement of the stem 10 relative to the steering tube 12.

The advantage of an expander nut structure as shown in FIG. 1 is that the quill tube 18 may be universally raised and lowered and rotationally positioned relative to the steering tube 12. A stem structure such as FIG. 1 holds the disadvantage in that the bolt 26 must be as long as the quill tube itself. This is because there is no position upon the quill tube that adequately supports the axial pressure generated by the elongated bolts head 36 when tightened except the upper rim 34 of the quill tube 12. Thus, a cap 22 carrying the bolt must be used to abut the upper rim 34. Any attempt to recess the cap (22) within the inner surface of the quill tube requires either the use of complex, weight adding and potentially weakening welding processes. Otherwise, positioning a recessed bolt head support platform within the quill tube requires inclusion of a platform engaging shoulder within the inner surface of the quill tube that either adds significantly to weight by adding a thicker lower inner wall with a ledge or, alternatively, requires removal of part of the upper inner wall to construct the ledge that may overly thin part of the quill tube inner wall.

One alternative to forming a cap ledge in the quill tube itself is to use of a simple insert that is fully disposed within the quill tube and abuts the expander nut face, thus acting as a platform against which the screw head may rest. Such an insert, however, may not prove axially secure enough to maintain sufficient compressive and rotational pressure relative to the expander nut. Alternatively, pinning or otherwise radially securing this kind of insert to the walls of the quill tube defeats the purpose of such a structure by adding significant weight and, again, weakening the quill tube wall.

As such, it has generally been necessary to continue to include the elongated bolt 26 as shown in FIG. 1 in most expander nut structures. This bolt, however, significantly adds to the overall quill tube weight since it must be constructed from solid hardened steel or similarly dense materials.

SUMMARY OF THE INVENTION

It is therefore an object of the present invention to provide a handlebar stem having a wedge shaped expander nut that utilizes a substantially shortened recessed bolt therewith.

It is another object of this invention to provide a handlebar stem having a substantially lower weight than conventional designs;

It is yet another object of this invention to provide a handlebar stem having increased strength and resistance to axial and rotational displacement within the steering tube.

A handlebar stem according to this invention provides a quill tube having an upper end for supporting a handlebar bracket and a lower end adapted to be disposed within a steering tube of, a bicycle type vehicle or the like. The quill tube carries an insert fixed within its lower end and projecting therefrom. The insert has an external cylindrical surface that is substantially flush with that of the quill tube. The lowermost end of the insert defines an angled nonperpendicular planar face relative to the sidewalls of the quill tube in which part of the planar face passes through the quill tube itself. The stem also includes a cylindrical expander nut having sidewalls substantially aligned with the sidewalls of the quill tube and an edge flushly engaging the angled nonperpendicular planar face of the insert and the quill tube. The insert and expander nut are held in axial compression by means of, in this, example, a machine screw or bolt, so that upon tightening of the screw or bolt, the insert and expander bolt translate from one another in radially opposite directions to provide radial locking pressure.

BRIEF DESCRIPTION OF THE DRAWINGS

The following and other objects of this invention will become apparent with reference to the following drawings in which:

FIG. 1 is a partial cross sectional side view of a conventional handlebar stem according to the prior art having an elongated bolt and wedge shaped expander nut mounted in a steering tube;

FIG. 2 is a partial cross sectional side view of a handlebar stem according to this invention mounted in a steering tube;

FIG. 3 is a bottom view of the handlebar stem of FIG. 2 taken along line 3—3;

FIG. 4 is a partial cross sectional front view of the expander nut, bolt and insert structure of the stem taken along line 4—4 of FIG. 2;

FIG. 5 is a partial cross sectional side view of the expander nut, bolt and insert structure of the stem of FIG. 2 taken along line 5—5 of FIG. 4; and FIG. 6 is an exposed exploded perspective view of the expander nut, bolt and insert structure of the stem of FIG. 2.

DETAILED DESCRIPTION OF THE PREFERRED EMBODIMENT

A stem assembly 38 according to this invention is illustrated in FIG. 2. The assembly 38 comprises a handlebar bracket extension tube 40 joined by welding or other suitable means to a substantially vertical cylindrical quill tube 42. In this example the quill tube is constructed from a seamless aluminum or, preferably, 4130 chromium molybdenum steel alloy heat treated for hardness and having a 1.2 millimeter thick sidewall 44. The outer diameter of the quill tube 42 is sized to fit snugly but movably (in an axial direction) within a conventional steering tube 46 as shown. The quill tube 42 according to this invention is hollow through its entire length but is capped 48 at the upper end 50 to prevent infiltration of dirt and debris, as well as for aesthetic and safety purposes.

The lower end 52 of the quill tube 42, which is seated in the steering tube 46, carries the expander nut support structure 54. This structure 54 comprises a wedge shaped expander nut 56, an insert 58 and a allen head machine screw or bolt 60 passing through a conforming clearance hole 62 in the insert 58 into a threaded hole 64 in the expander nut 56. The bolt 60 in this example is sized as M8×1.25, but may be sized smaller as M6 or other appropriate sizes that utilize special hardened materials to save weight. The expander bolt support structure 54 is detailed fully in various views in FIGS. 3-6. Thus, any discussion herein relating to the structure 54 generally should be taken with reference to each of these figures.

The insert 58 utilized at the lower end 52 of the quill tube 42 is a substantially cylindrical structure having upper and lower sections 66, 68 respectively, with varied (tiered) diameters. It is machined, in this example, from a solid piece of 6061 alloy heat treated to T6 hardness. The upper section 66 of the insert 58 is machined to seat within the quill tube 42 as shown and is approximately 18-20 millimeters long (axially), having a perpendicular (squared) upper face 70. The diameter of this section 66 is slightly oversized (0.04-0.05 millimeters) relative to the inner diameter of the quill tube (approximately 22.6 millimeters) in order to form a tight press fit capable of withstanding, in this example, a load significantly greater than contemplated for any given rider. To further facilitate construction by a press fit, the uppermost rim 72 of the insert 58 includes a slight bevel.

The lower section 68 of the insert 58 carries a larger diameter than that of the upper 66 and is sized to approximate the quill tube outer diameter which, in this example, is approximately 25 millimeters. The uppermost edge or rim 74 of the lower section 68 abuts a perpendicular edge 76 (relative to the sidewall) of the quill tube 42 to form a flush and tight circumferential joint 78. The lower most edge 80 of the lower section 68 of the insert 58 is, conversely, angled sharply at 25°-35° and, preferably, 35° (82) relative to the sidewall 84. Its lowermost point 86 is spaced approximately 25 millimeters from the joint 78 of the upper and lower sections 66, 68. At such a length, the plane defined by the angled lowermost edge 80 passes through part of the quill tube 42 itself. This edge, hence, cuts off part of the perpendicular joint 78 between the insert 58 and quill tube 42 and, thus, forms a bridging surface 88 between the insert 58 and wall 44 of the quill tube 42.

Construction of the joined insert 58 and quill tube 42 structure is, in this example, accomplished by press fitting a fully cylindrical (squared top and bottom face) insert into the (squared) lower rim of the quill tube as described above. The joined structure is then machined at an angle to form the desired diagonally cut face defining an oval-like outer perimeter that passes through both the insert and quill tube. In forming the face 80 it is important that the bridging surface 88 not extend too far into the quill tube 42 since enough of the insert 58 must still lie completely within the quill tube inner wall to ensure a strong press fit. Note that the fit may be accomplished, alternatively, by suitable adhesives and proper addition of adhesive-holding grooves to the insert according to this invention.

The bridging surface 88 between the quill tube 42 wall and insert formed by the angled face or edge 80 in this example accepts a corresponding upper face 90 of the expander nut 56. The angle 92 of the expander nut 56 upper face 90 relative to its sidewall 94 is equal to that (82) of the lowermost edge 80 of the insert/quill tube structure. Thus, when the expander nut 56 abuts the quill tube 42 as shown, its cylindrical outer sidewall 94 projects substantially flushly from and is aligned with those of the quill tube and insert (44, 84) giving the appearance of one unbroken cylindrical surface. The overlap of the expander nut 56 axially onto the quill tube 42 in the region of the bridging surface 88 is approximately 8-10 millimeters taken from the perpendicular insert/quill tube joint edge 78. Note that the angled face 90 of the expander bolt 56 is formed similarly to that (80) of the insert 58. The nut 56 is first finished in the form of a complete cylinder with squared top and bottom faces. The top face, according to this example, is then machined to create the angled ovular surface 90.

The quill tube bridging surface 88 according to this embodiment particularly enhances the rotational stability of the expander nut 56 relative to the quill tube 42. This added stability derives from the fact that any torque imparted to the expander nut 56 is absorbed axially and as hoop stress as well as radially at the bridging surface 88. Thus, a very positive rotational connection is attained.

The positive connection brought about by the bridging surface 88 endows the insert 58 with heretofor unavailable strength making possible the use of a substantially shorter recessed bolt 60. This bolt 60 is depicted with its head 96 laying flush against the upper face 70 of the insert 58. Alternatively, an even shorter bolt may be employed if a suitably sized counterbore is placed in the insert upper face 70 for accepting the bolt head.

Additional opposing counterbores 101, 102 have been placed in both the insert 58 and the expander nut 56 respectively where their surfaces meet. This process, in general, occurs prior to cutting the angled face 90 as discussed above These counterbores 100, 102 each serve to form an even inner annular surface 104, 106, necessary to properly seat the threaded end 108 of the bolt 60, and also remove unnecessary weight at the insert and expander nut engaging faces (80, 90) where some centrally disposed material is unnecessary. In this example, the insert 58 specifically includes a first upper counterbore 110 approximately 11 millimeters in diameter and a second larger diameter 18-19 millimeter lower counterbore 112 proximate the joint with the expander nut 56. Similarly, the expander nut 56 includes an approximately 18-19 millimeter opposing counterbore 102 proximate the face 90 joining the insert 58.

For increased torsional strength relative to the steering tube 46, the expander nut 56 may include a series of splines 114 formed vertically along its sidewall 94 surface. Other similar surface texturing may be utilized with the goal of enhancing the rotational grip of the nut 56 against the inner wall of the steering tube 46. It is noted that sufficient strength may be obtained even without the use of a textured surface according to this invention.

Installation and use of a stem assembly 38 according to this invention is roughly similar to that of a conventional stem (such as shown in FIG. 1). However, in order to tighten and loosen the stem 38 according to this invention, the cap 48 at the top of the quill tube 42 must first be removed to access the insert upper face 98 and an elongated wrench (in this case a 6 millimeter Allen wrench for a similarly sized screw (FIG. 2)) 116 is inserted downwardly into the quill tube 42 to engage the head 96 of the bolt 60. Like a conventional expander nut design, the tightening of the bolt 60 results in radial offset of the expander nut 56 relative to the insert/quill tube structure (note somewhat exaggerated clearances 118, 120 of FIGS. 2, 3, and 5) causing an extremely positive locking of the stem assembly 38 to the inner wall of the steering tube 46.

It should be understood that the preceding is merely a detailed description of a preferred embodiment. It should be apparent to those skilled in the art that various modifications and equivalents may be made without departing from the spirit or scope of the invention. The preceding description is meant to be taken only by way of example and to describe only preferred embodiments and not to otherwise limit the scope of the invention.

What is claimed is:

1. A handlebar stem having a quill tube and an expander nut structure comprising:
    an insert selectively positioned within an end of a cylindrical quill tube adapted to be inserted into a steering tube, the insert having a narrowed cylindrical section disposed within the quill tube and a cylindrical external section having a sidewall aligned with the quill tube and of substantially equal outer diameter to an outer diameter of the quill tube;
    the external section of the insert joining the quill tube at a joint substantially perpendicular relative to the sidewall of the insert, the insert having a lowermost edge defining a plane, the plane being slanted with respect to the sidewall so that an angle between the sidewall and the plane taken from a lowermost point of the lowermost edge is less than a right angle, the plane passing through the perpendicular joint and upwardly into a part of the quill tube sidewall, the part of the quill tube sidewall being shaped to lie within the plane and forming a part of the plane;
    an expander nut having a cylindrical sidewall substantially equal in outer diameter to the outer diameter of the insert sidewall and having an upper surface that defines a slanted non-perpendicular plane relative to the sidewall of the expander nut, the slanted plane being constructed and arranged so that the sidewall of the expander nut is substantially concentric and aligned with the sidewall of the insert and the quill tube when the upper surface of the expander nut mates in a face-to-face relationship with a surface defined by the plane of the lowermost edge of the insert and the quill tube; and
    a bolt passing through the insert and engaging a threaded hole in the expander nut when the surfaces thereof mate in the face-to-face relationship, the bolt aligned along a direction substantially parallel to the sidewalls of the insert and the expander nut and the bolt having a head abutting an uppermost surface of the insert disposed within the quill tube so that compression applied by the bolt between the insert and the expander nut causes the expander nut to displace relative to the insert along the mating surfaces in opposite directions to bear against inner walls of the steering tube.

2. A handlebar stem as set forth in claim 1 wherein the narrowed cylindrical section of the insert includes an outer diameter greater than an inner diameter of the quill tube so as to form an interfering press fit between the insert and the quill tube.

3. A handlebar stem as set forth in claim 1 wherein the angle of the plane defined by the lowermost edge of each of the quill tube and the insert is in a range of 25°–35° relative to an axially disposed line through a lowermost point upon the insert sidewall.

4. A handlebar stem as set forth in claim 3 wherein the plane extends from the joint of the quill tube and the insert upwardly to an uppermost point of intersection between the plane and an outermost surface of the quill tube sidewall over a distance taken in a direction parallel to the quill tube sidewall and perpendicular to a plane defined by the joint in the range of 10–12 millimeters.

5. A handlebar stem as set forth in claim 1 wherein each of the insert and the expander nut include, proximate engaging surfaces thereof, a counterbore having an inner diameter larger than the threaded hole and having a substantially perpendicular base relative to the sidewall of each of the insert and the expander nut.

6. A handlebar stem as set forth in claim 5 wherein at least the insert includes a plurality of varied diameter counterbores with increasing diameter in a direction from the base to the lowermost edge of the insert.

7. A handlebar stem as set forth in claim 1 wherein the uppermost surface of the insert includes a recess for countersinking the head of the bolt.

8. A handlebar stem as set forth in claim 1 wherein the sidewall of the expander nut includes a textured surface.

9. A handlebar stem comprising:
    a cylindrical quill tube having an upper end for supporting a handlebar bracket and a lower end adapted to be disposed within a steering tube;
    an insert fixed within the lower end of the quill tube and having an external cylindrical sidewall substantially flush with a cylindrical sidewall of the quill tube, a lowermost edge of the insert defining an angled nonperpendicular planar face relative to the sidewall of the quill tube wherein part of the planar face passes through the quill tube;
    a cylindrical expander nut having a sidewall substantially parallel to and aligned with the sidewall of the quill tube and the insert and having an upper surface for flushing engaging the angled nonperpendicular planar face of the insert and the quill tube when the sidewall of the expander nut is brought into alignment and parallel to the sidewall of the insert and the quill tube; and
    means for applying axial compression between the insert and the expander nut so that each of the insert and the expander nut translate from one another along the engaging faces thereof in radially opposite directions so as to bear against opposing inner edges of the steering tube.

10. A handlebar stem as set forth in claim 9 wherein the means for applying axial compression includes a bolt, disposed along a central axis and extending between the insert and the expander nut, the bolt having a head abutting an uppermost surface of the insert and shaft threads engaging a threaded hole in the expander nut.

11. A handlebar stem as set forth in claim 10 wherein the bolt head is countersunk into the uppermost surface of the insert.

12. A handlebar stem as set forth in claim 11 wherein the quill tube includes a hole and an upper end thereof and further comprising a removable cap for covering the hole at the upper end of the quill tube.

13. A handlebar stem as set forth in claim 9 wherein the angled non-perpendicular planar face intersects an axially disposed line through a lowermost point upon the sidewall of the insert at an angle in the range of 25°–35°.

14. A handlebar stem as set forth in claim 9 wherein the insert includes, upon a portion thereof that is disposed within the quill tube, a diameter slightly larger than an inner diameter of the quill tube to form an interfering fit therebetween.

15. A handlebar stem as set forth in claim 9 wherein each of the expander nut and insert comprise an aluminum alloy.

* * * * *